INVENTOR
Oscar A. Thelin
By Kay, Totten & Brown,
Attorneys

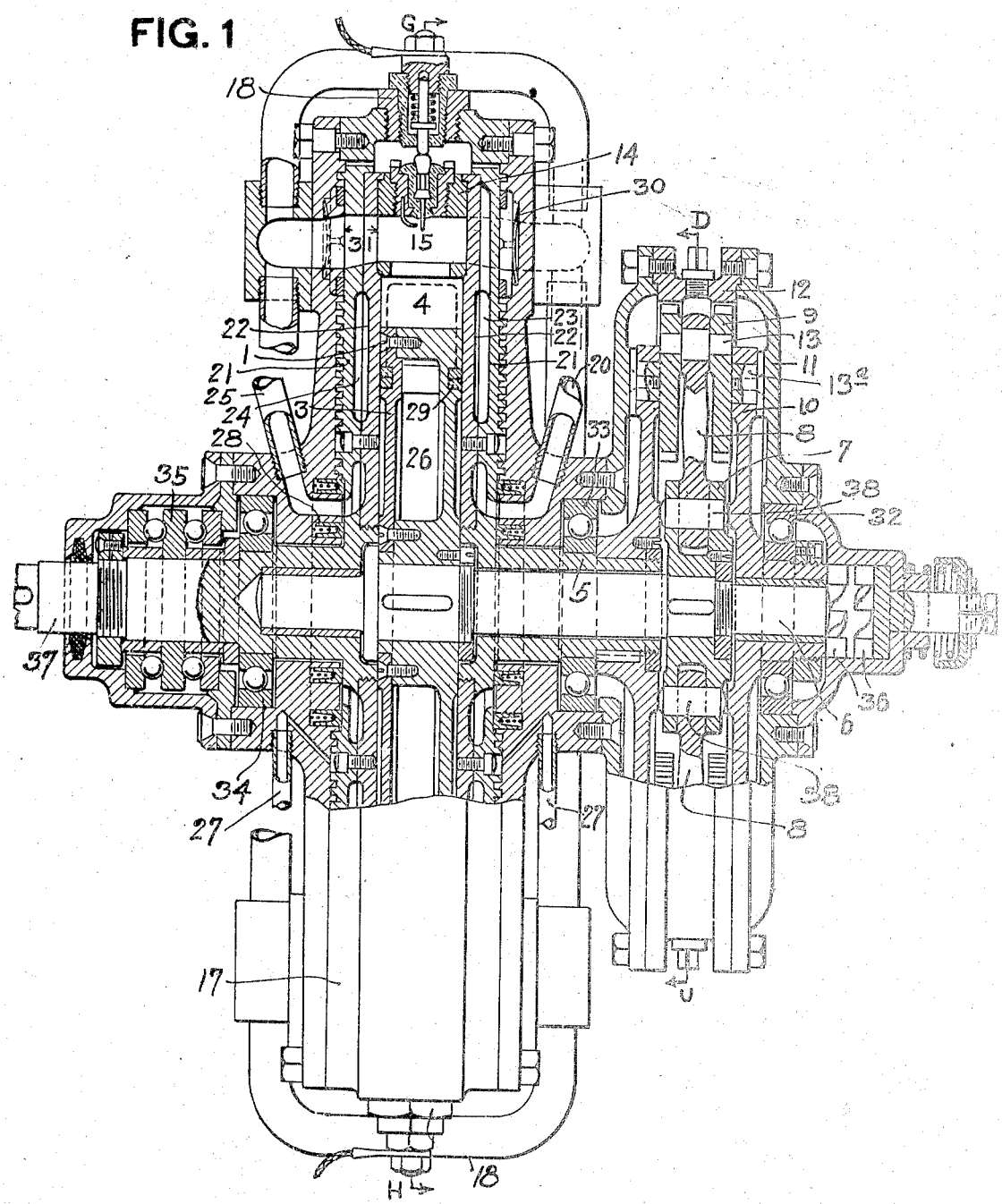

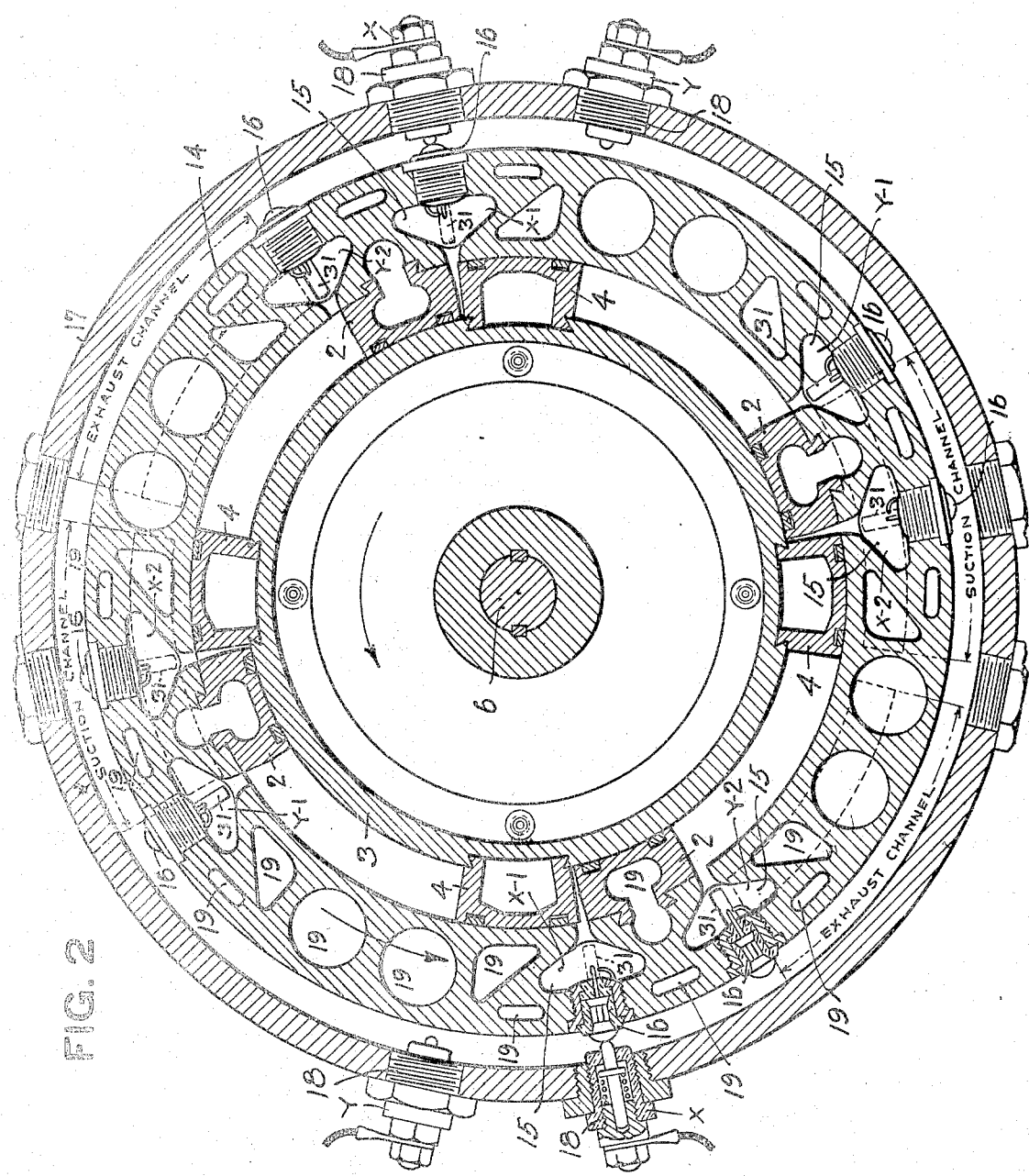

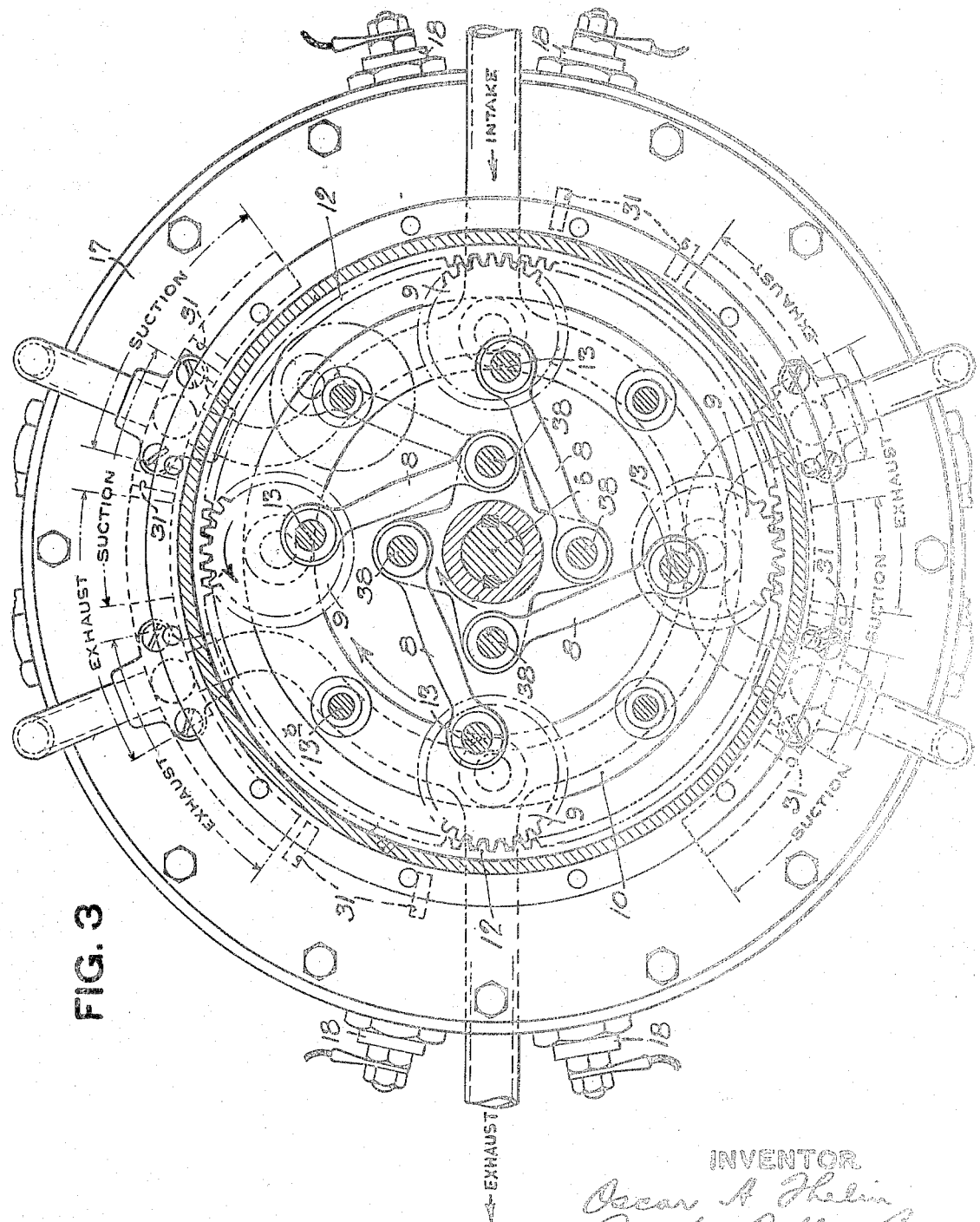

May 5, 1925. 1,536,245
O. A. THELIN
ROTARY PISTON ENGINE
Filed Sept. 2, 1920 13 Sheets-Sheet 6

INVENTOR
Oscar A. Thelin
By Kay, Totten & Brown
Attorneys

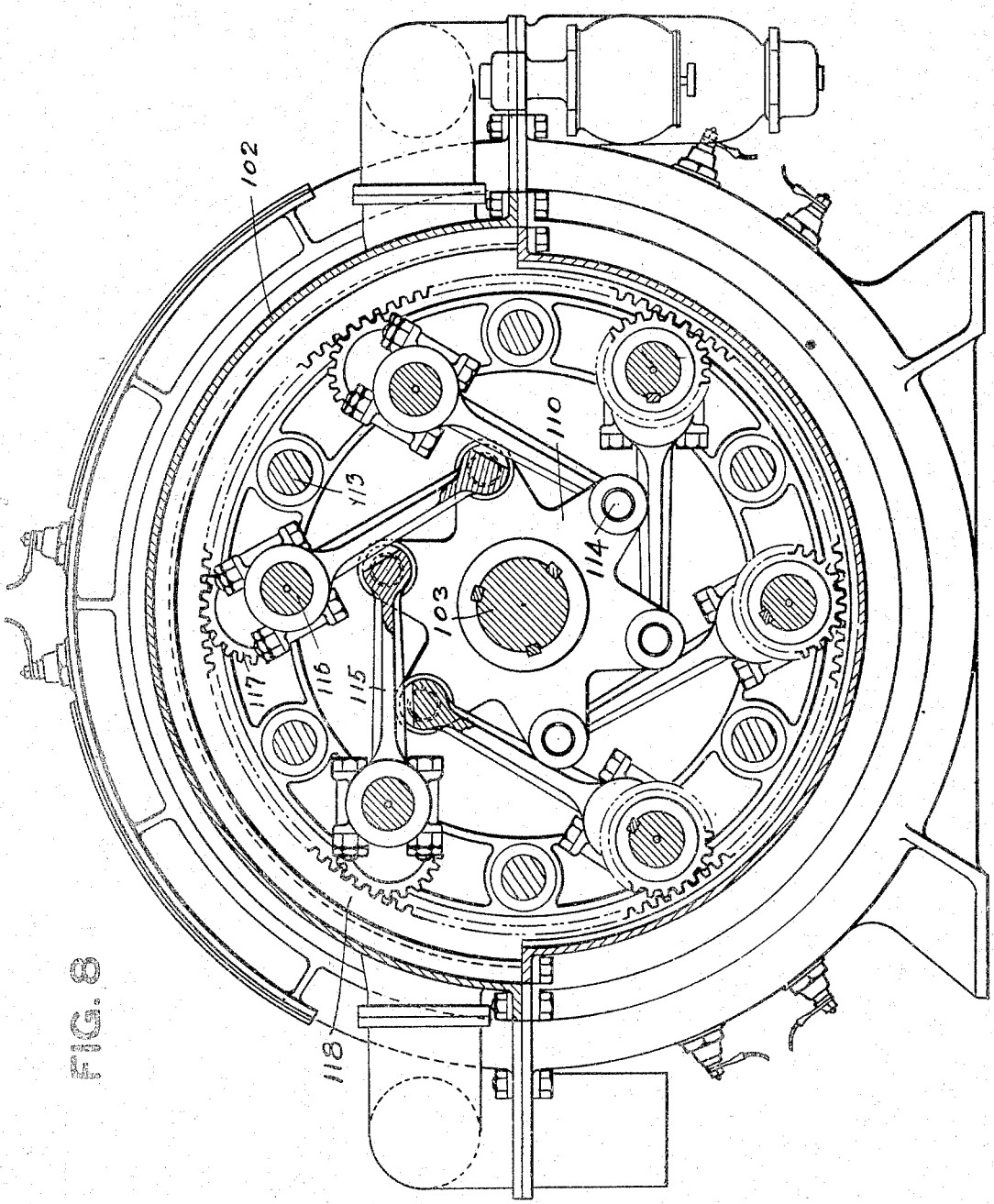

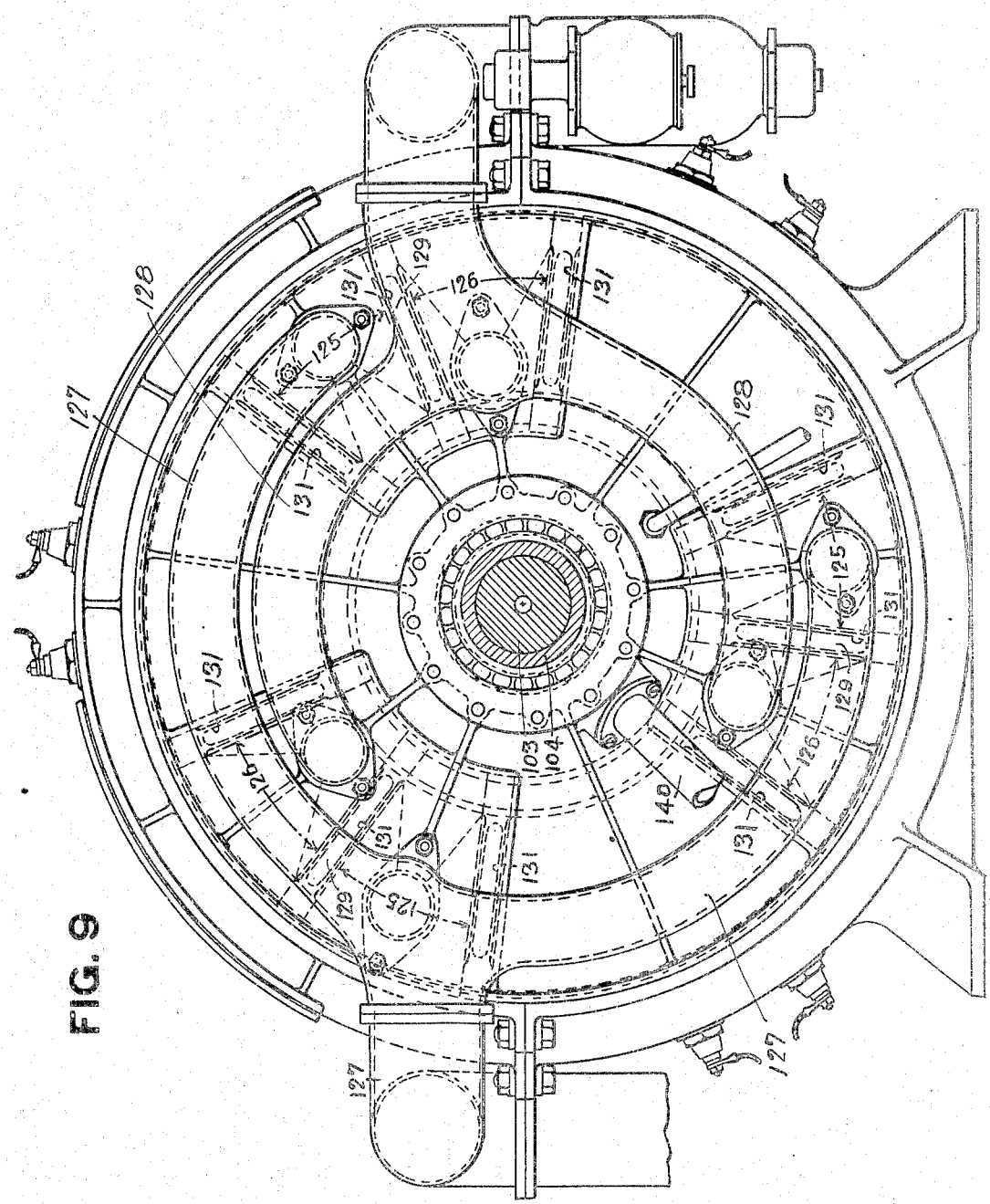

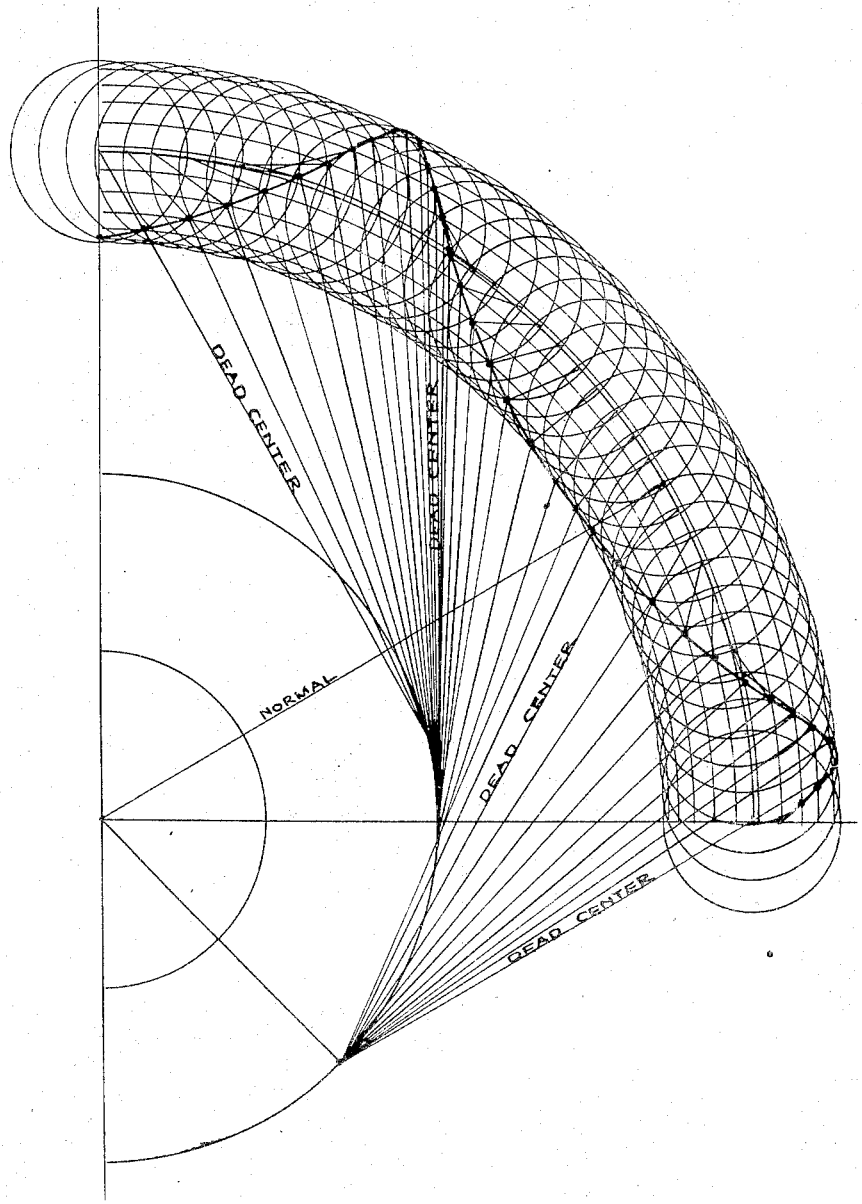

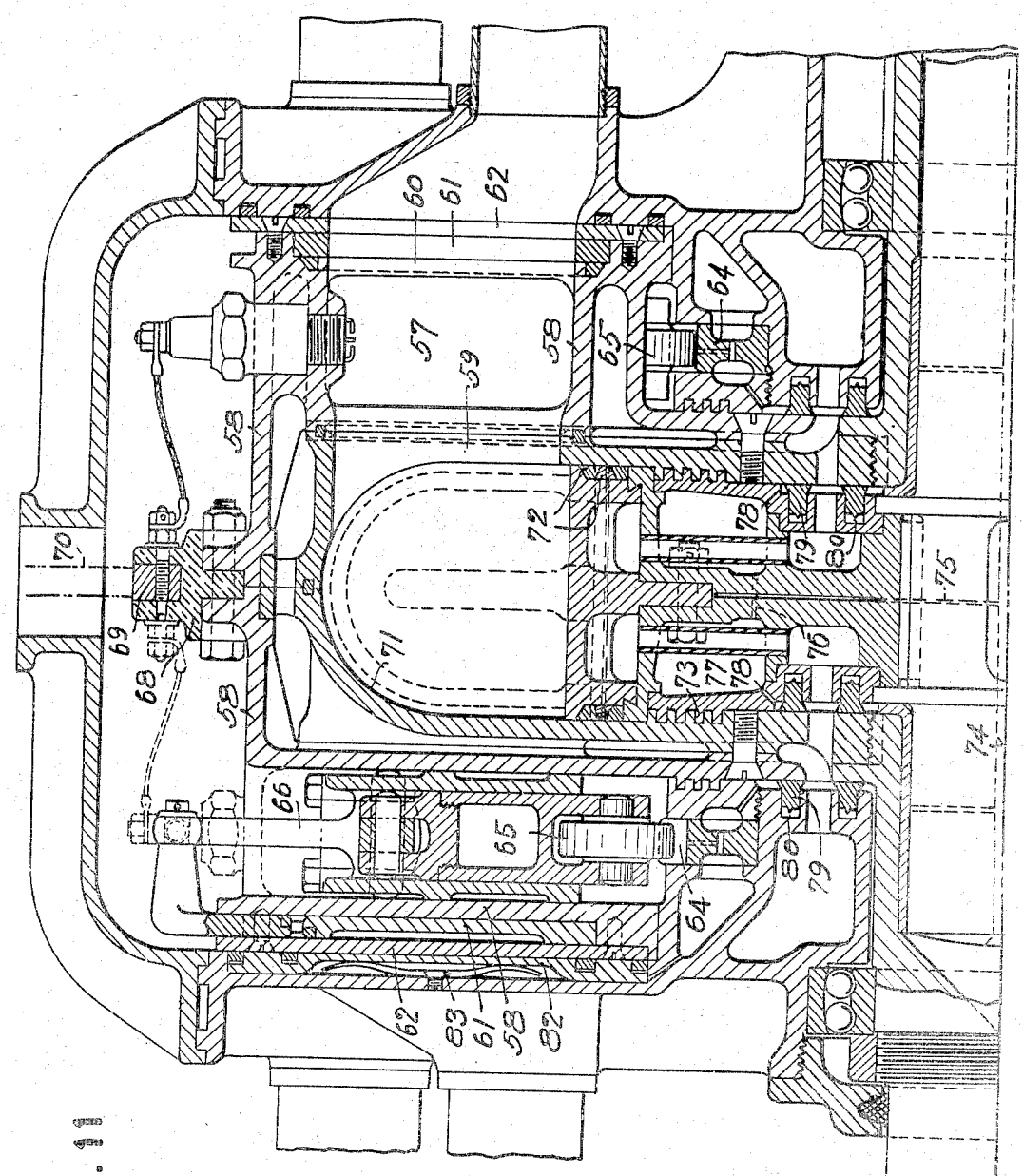

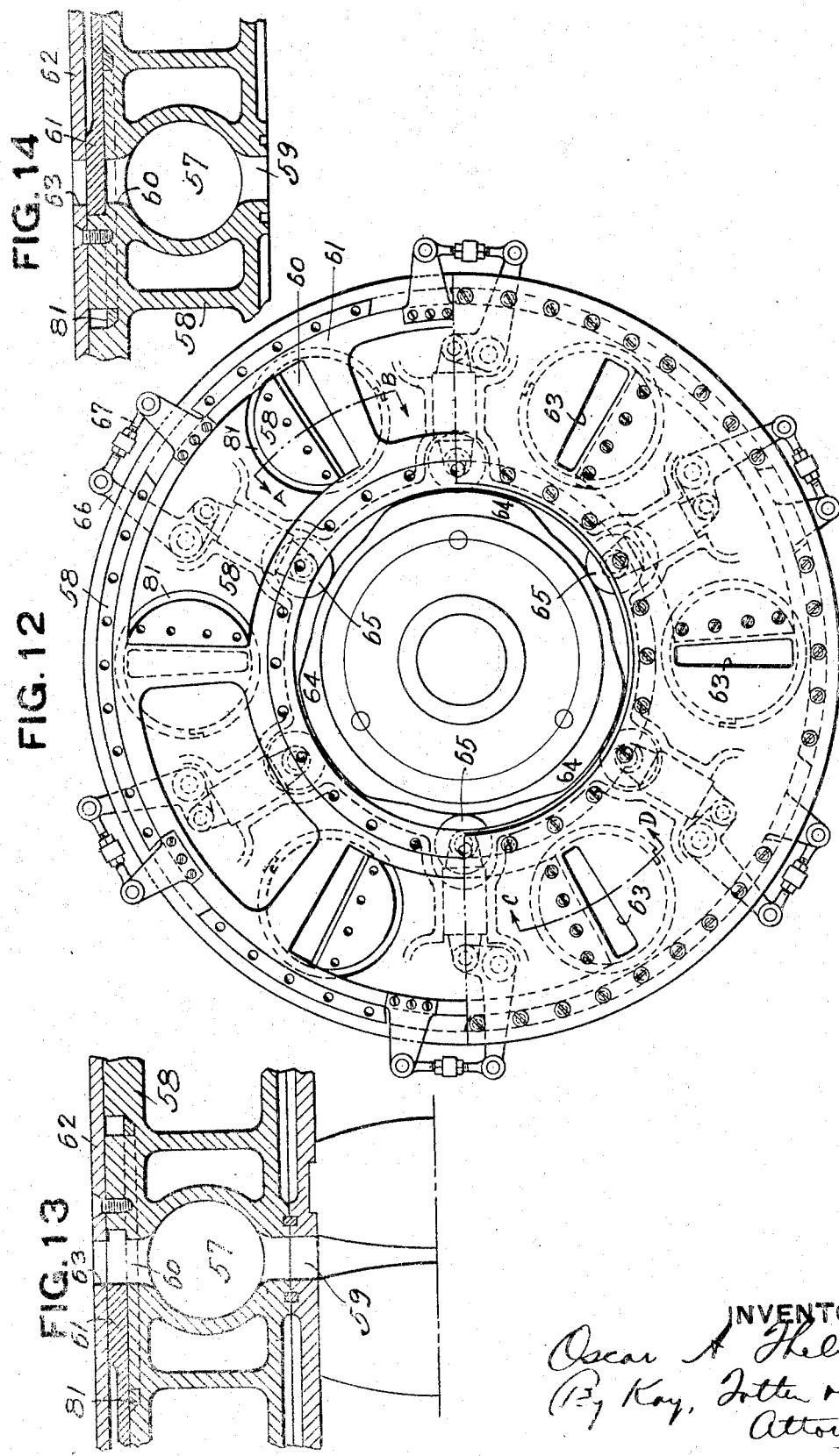

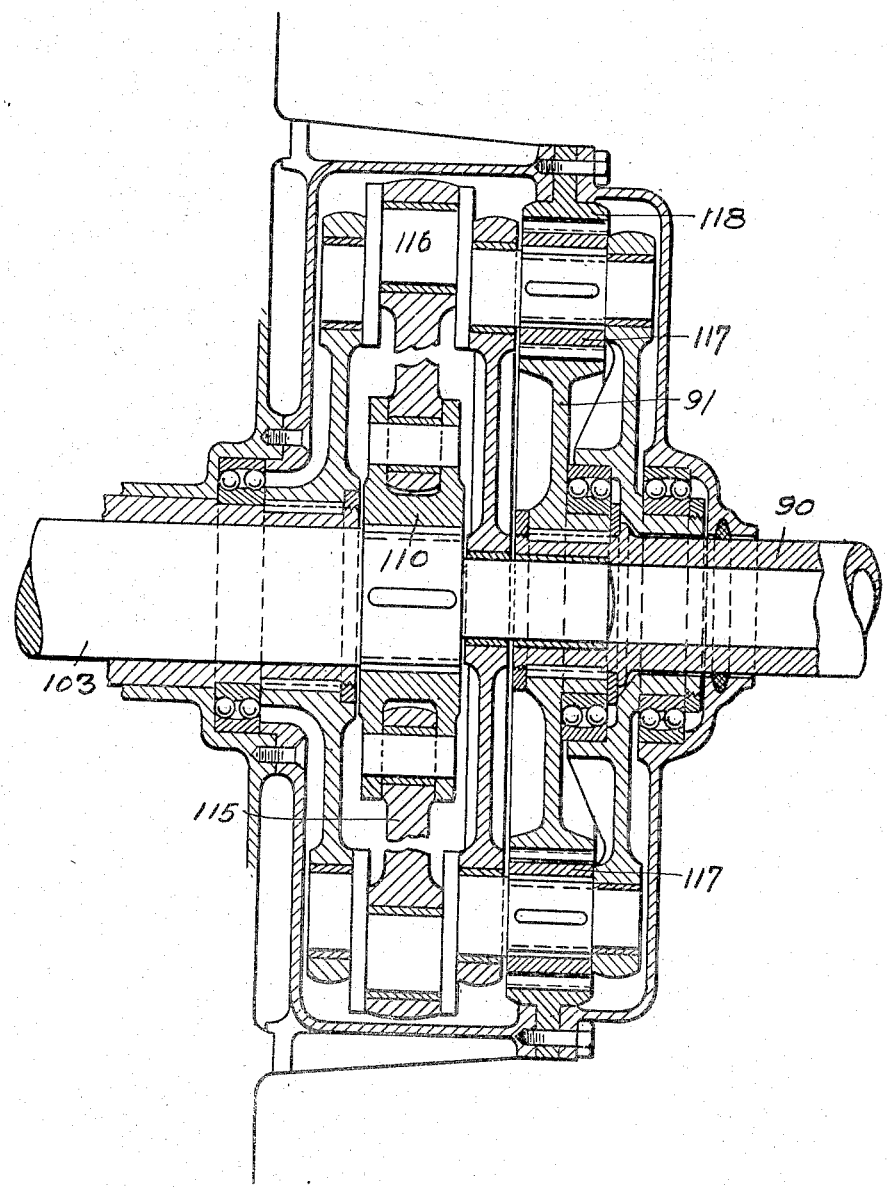

Patented May 5, 1925.

1,536,245

UNITED STATES PATENT OFFICE.

OSCAR A. THELIN, OF HORTEN, NORWAY.

ROTARY PISTON ENGINE.

Application filed September 2, 1920. Serial No. 407,788.

(GRANTED UNDER THE PROVISIONS OF THE ACT OF MARCH 3, 1921, 41 STAT. L., 1313.)

*To all whom it may concern:*

Be it known that I, OSCAR A. THELIN, a subject to the King of Norway, and resident of Horten, in the county of Westfold and country of Norway, have invented a new and useful Improvement in Rotary Piston Engines (for which I have filed application in Norway, Oct. 19, 1918, No. 14,687); and I do hereby declare the following to be a full, clear, and exact description thereof.

My invention relates to rotary piston engines, and it has for its object to provide an engine for use either as a prime mover, as in an internal combustion engine, steam engine or the like, or as a driven element, as in a pump.

It its simplest from the engine consists of two rotating elements or rotors, one of which carries the cylinder blocks and the other the pistons, and which rotors revolve in a stationary housing and are interlocked by a crank mechanism in such a manner as to cause a reciprocating motion between said blocks and pistons when the rotors revolve. The cylinder blocks travel in an annular space, which may conveniently be located between the rotors, and they divide this space into several chambers in which said pistons oscillate. The rotors are secured to separate shafts which may be so interconnected by the crank mechanism that while the one rotor, preferably the larger and heavier one, is running with constant velocity the other rotor, making the same number of revolutions, will run with fixed speed variations in the same direction. The relative motion of the blocks and pistons of the two rotors can be used to produce suction or compression in said chambers, the same as can be done in a cylinder of an ordinary reciprocating engine, and this feature may be utilized for pumping of fluids or gases; or the apparatus may be used as a steam engine or an internal combustion engine, as hereinafter more fully described and explained.

Figure 15:
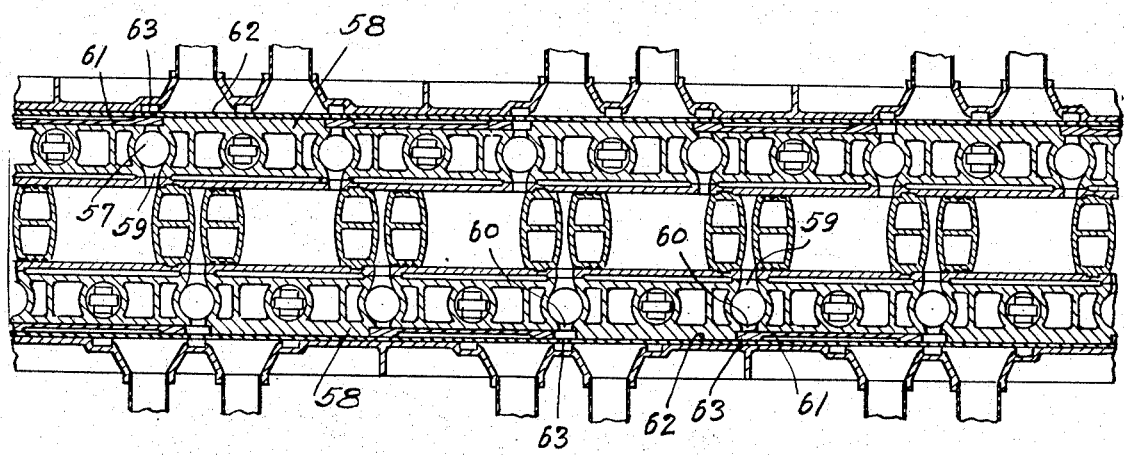
Figure 4:
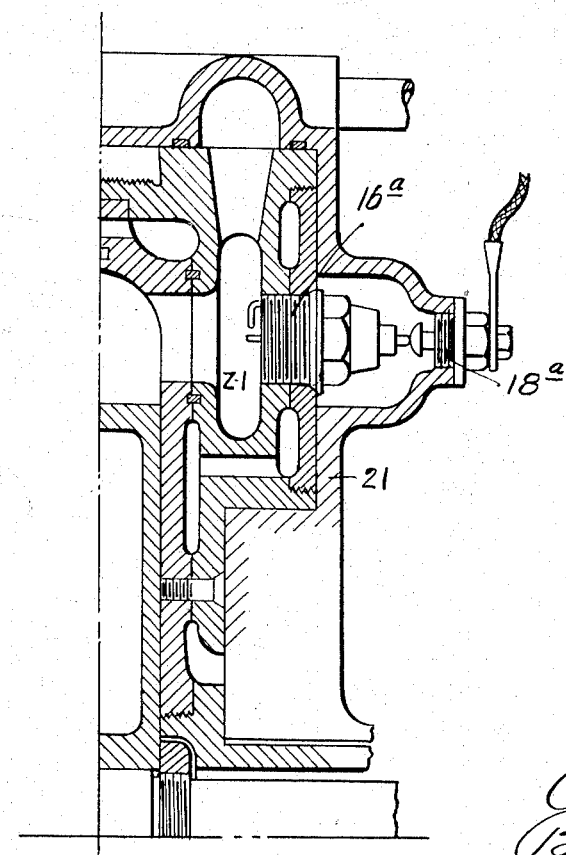
Figure 5:
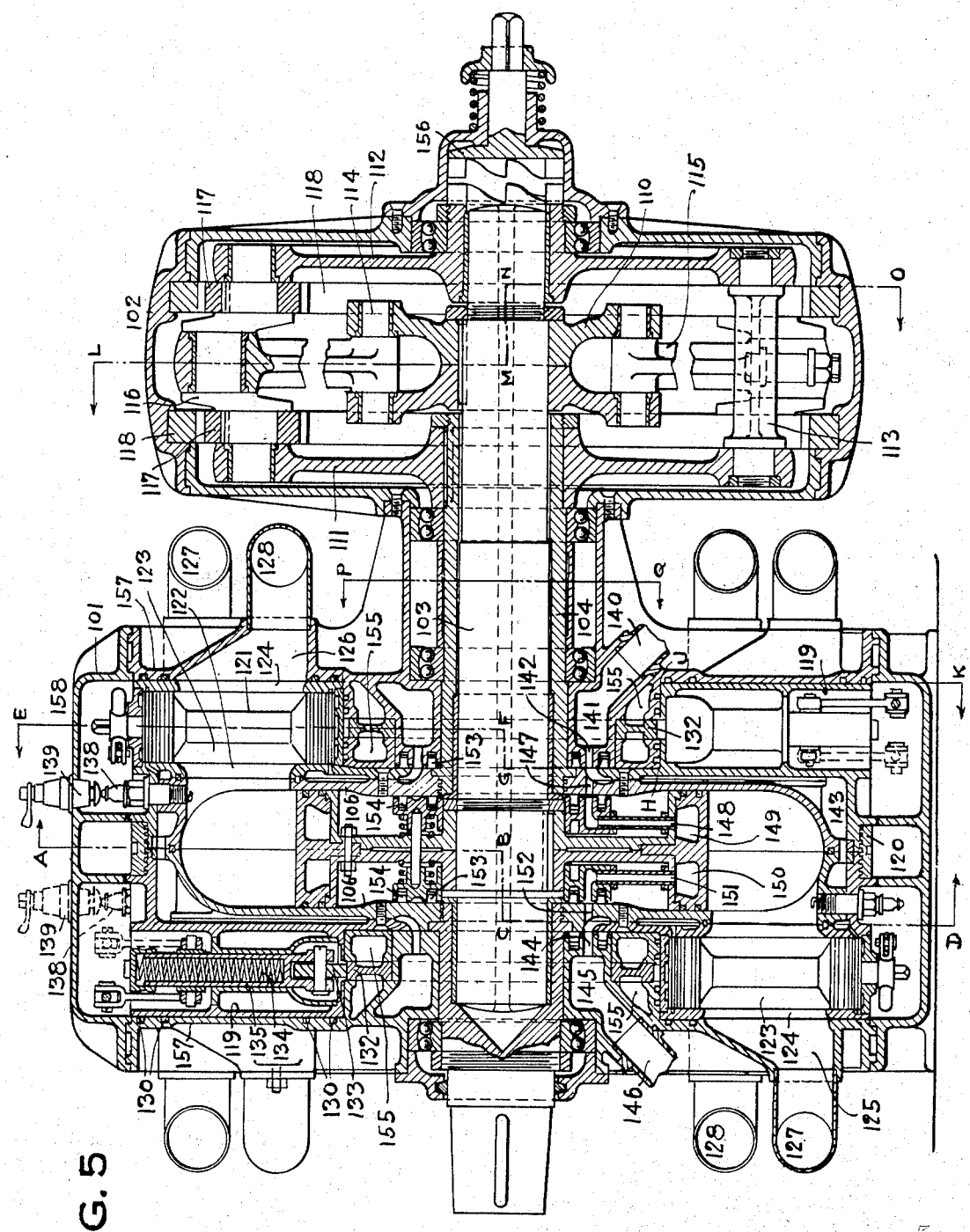
Figure 6:
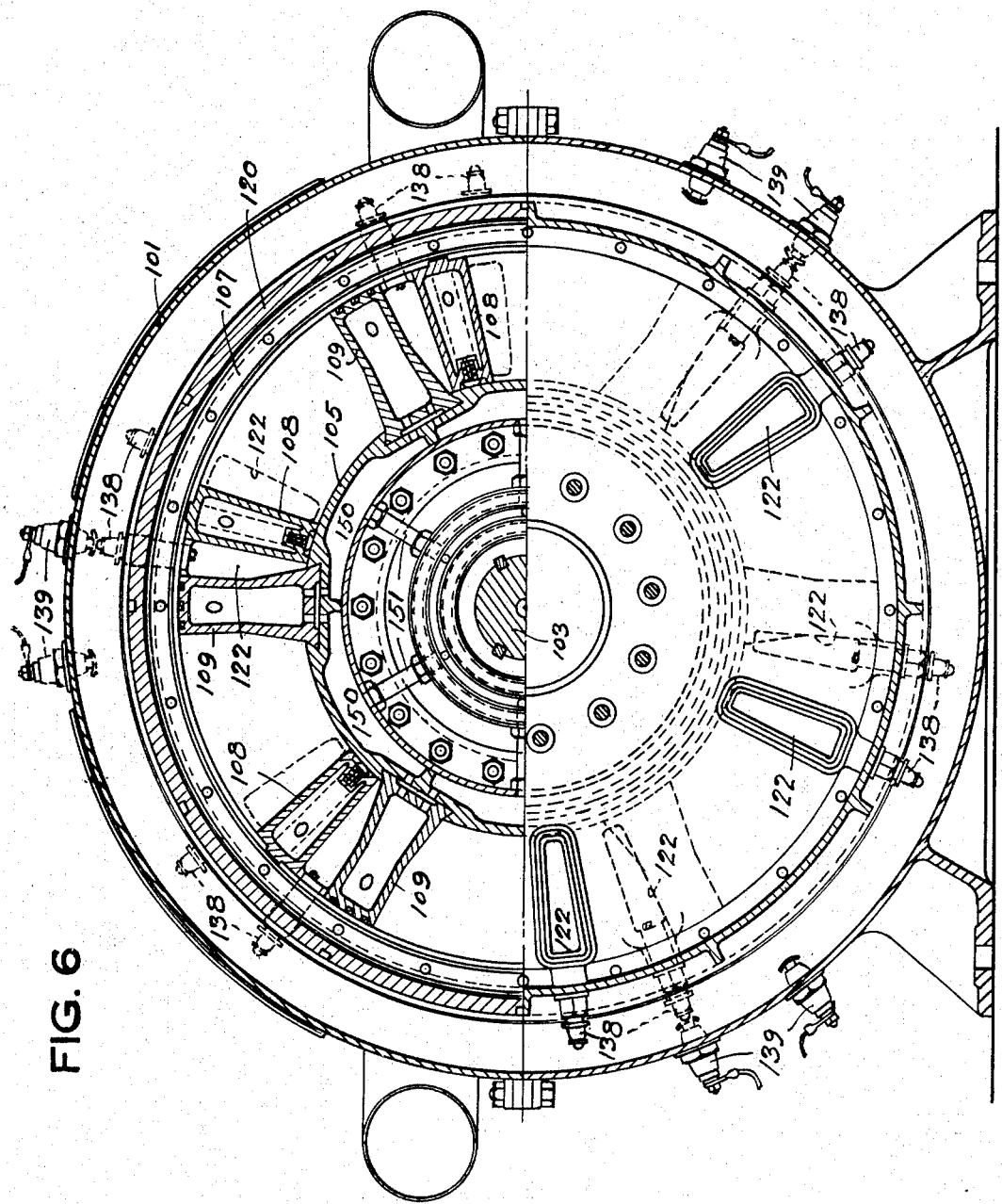
Figure 7:
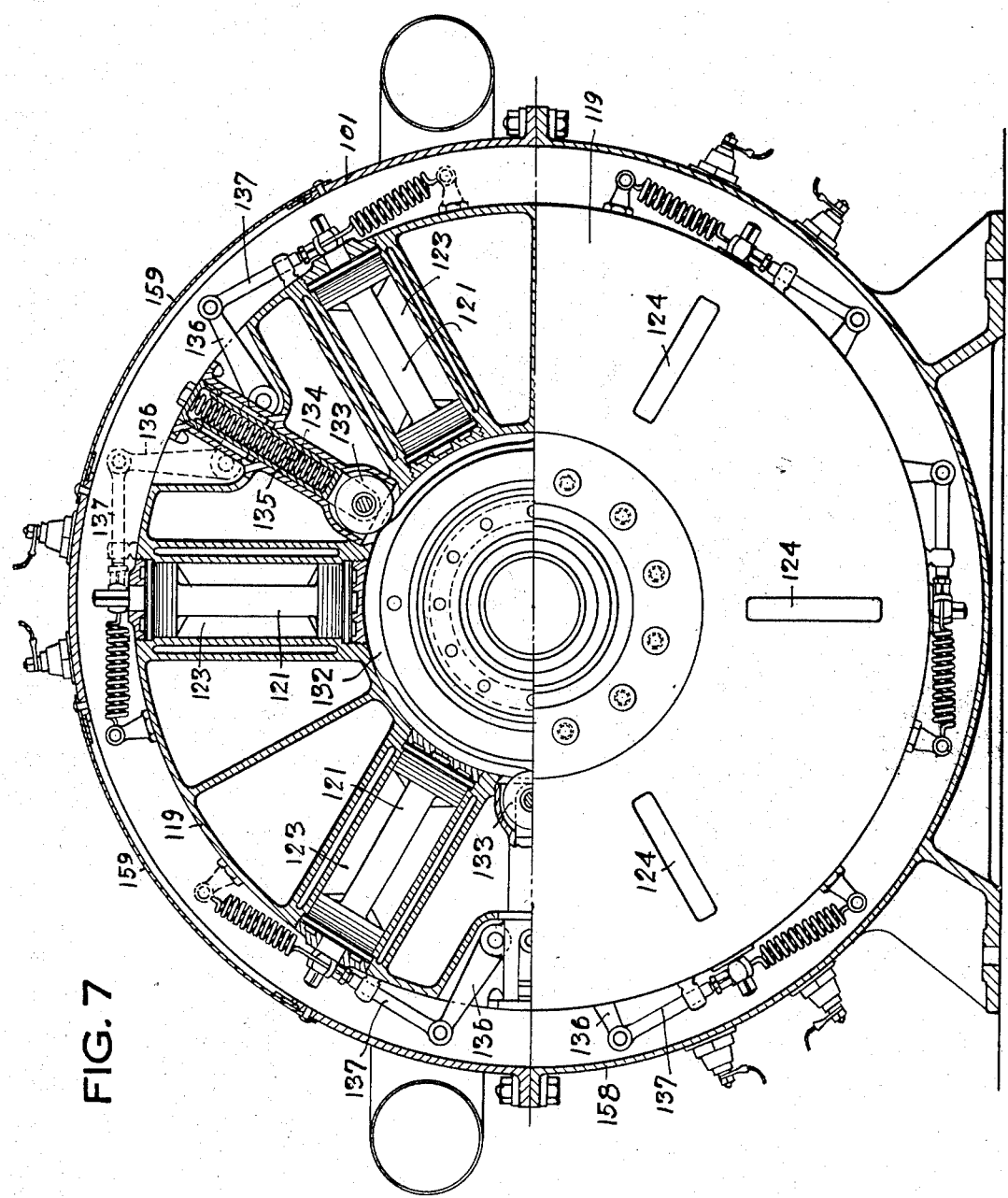

In the accompanying drawings, Fig. 1 is a longitudinal sectional view through the center of an engine constructed in accordance with my invention. Fig. 2 is a transverse sectional view of the rotors of the same engine, the section being taken substantially along the line G—H, Fig. 1; Fig. 3 is a transverse sectional view through the crank case of the engine, the section being taken substantially on the line C—D, Fig. 1, this figure showing also the arrangement of the intake and exhaust piping and the position and length of the suction and exhaust channels in the rotor housing. Fig. 4 is a fragmentary sectional view showing a modified arrangement of spark plugs and contact plugs. Fig. 5 is a longitudinal sectional view taken centrally through a modified form of invention provided with poppet valves. Fig. 6 is a side view of the rotors shown in Fig. 5, the upper half of this figure being shown in section, substantially on the line A—B Fig. 5, and the lower half showing the rotors in elevation with the valve casing removed. Fig. 7 is a view of the large rotor, the upper half being in section substantially along the line E—F, Fig. 5, and the lower half being in section substantially along the line G—H J—K, Fig. 5, with the rotor housing cut away. Fig. 8 is a transverse sectional view through the crank case of the same engine, the section being taken substantially on the line L—M, N—O, Fig. 5. Fig. 9 is a side view of the rotor housing together with the carbureter and the intake and exhaust piping, the central parts being shown in section substantially along the line P—Q, Fig. 5. Fig. 10 is a diagram showing the crank, connecting rod and wrist-pin motions which take place in the operation of my engine. Fig. 11 is a half longitudinal sectional view taken through the rotors and rotor housing of a still further modification of my invention. Fig. 12 is a side view of the rotor structure shown in Fig. 11, showing the valve mechanism with the rotor housing removed. Fig. 13 is a fragmentary sectional view showing the combustion chamber with the valve port open, the section being taken substantially along the line A—B, Fig. 12. Fig. 14 is a fragmentary sectional view substantially on the line C—D, Fig. 12, showing the combustion chamber with the valve port closed. Fig. 15 is a folded out section through the cylinders on the pitch circle of the cylinder blocks and pistons, showing the relative arrangement of blocks, pistons, combustion chambers, valve ports, disc valves and intake and exhaust piping; and Fig. 16 is a longitudinal central sectional view of the crank case of another modification of my invention wherein the driving shaft is required to be driven at high speed.

In the form shown in Figs. 1, 2 and 3 the apparatus is arranged as a four cylinder double acting four cycle engine. This apparatus comprises a larger and outer rotor 1 and a smaller and inner rotor 3. The outer rotor 1 has four blocks 2, dividing the annular space between the two rotors into four chambers which, for the purpose of analogy with an ordinary reciprocating engine, will be termed cylinders. The smaller and inner rotor 3 has four pistons 4, one in each cylinder. The shaft 5 carrying the large rotor and the shaft 6 carrying the small rotor are connected to each other in a particular manner by means of a cross-head 7, which is keyed to the shaft 6 of the small rotor, wrist pins 38, connecting rods 8, crank pins 13, pinions 9 and bearing plates 10. Said pinions engage an internal gear 12 and rest on taps 13ª in the journals of the bearing plates 10, one of which plates is keyed to the shaft of the large rotor. The two bearing plates are rigidly secured to one another by means of distance bolts 13ᵇ, shown in Fig. 3, and move as one piece with the large rotor. The internal gear 12 is secured to and forms part of the stationary crank case housing 11. All reactionary forces within the engine are ultimately transmitted to said internal gear 12, which in that respect takes the place of the cylinder heads in an ordinary reciprocating engine.

If the engine is turning in the direction indicated by large arrow in Fig. 3, the pinions 9, due to the internal gear, receive a rotation around their own axes in the opposite direction, while said pinion taps 13ª and the pinions 9 are bodily carried around, by the bearing plates, in the direction the engine is traveling. For a forty-five degree rotation of the large rotor the pinions will revolve one hundred and eighty degrees around their own axes and will move to positions as indicated for one of the pinions in dot and dash lines at A in Fig. 3; the ratio of diameters for the internal gear 12 and the pinions 9 being made four to one. The crank pins now have a position, with regard to the pinion centers, diametrically opposite to that at the start. During said forty-five degree rotation the small rotor, which moves only together with the cross-head, must remain practically stationary, since the motion of the links 8, caused by said rotation of the large rotor, has been compensated for by the changed position of the crank pins so as not to affect the position of the cross-head 7. During the next forty-five degree rotation of the large rotor, the pinions again revolve one hundred and eighty degrees, giving the cross-head and the small rotor a corresponding motion of ninety degrees due to the motion of the crank pins. The rotational difference between the large and the small rotors, therefore, will be forty-five degrees for each one-eighth revolution of the large rotor; the blocks and pistons of the rotors alternately approaching each other during one forty-five degree rotation and separating during the next forty-five degrees.

The large rotor 1 is built up of a cylinder casting 14, blocks 2, heads 22 and jackets 21. The combustion chambers 15 with their spark plugs 16 are located in the cylinder casting which also has a number of passages 19 for the purpose of water cooling. Water enters through pipe 20, reaches passages 19 through cooling space 23 and escapes by way of cooling space 24 and pipe 25. Effective water cooling for the combustion chambers and the cylinder walls and blocks of the large rotor is thus provided for and a similar cooling arrangement can readily be applied to the small rotor if found necessary or desirable. The construction of the small rotor is easily understood from Fig. 1. The chamber 26 may be utilized for either lubricating or cooling purposes.

The engine has eight combustion chambers, one at either end of each cylinder, and there are eight spark plugs 16, one to each combustion chamber, which cause ignition by contact with plugs 18. There are four such contact plugs electrically connected with battery or magneto and placed in the stationary rotor housing 17 to make contact with the spark plugs and cause ignition at proper moments. Four of the combustion chambers, marked X—1 and X—2 in Fig. 2, serve the front ends of the cylinders ahead of the pistons and their spark plugs are placed in line with the two contact plugs marked X. These combustion chambers have ports 31 which sweep the suction and exhaust channels on the driving side of the rotor housing. The other four combustion chambers, marked Y—1 and Y—2, serve the rear ends of the cylinders behind the pistons and have spark plugs in line with the two contact plugs marked Y. These four combustion chambers also have ports 31 but these ports sweep the suction and exhaust channels on the crank side of the rotor housing. The two contact plugs marked X are located diametrically opposite and twenty-two and one-half degrees ahead of the contact plugs marked Y, which also are placed diametrically opposite. Furthermore, the contact plugs marked X are set somewhat to one side, off the center of the rotor housing, while the contact plugs Y are set somewhat to the other side to be in line for contact with their respective spark plugs only, as already explained.

As a matter of simplicity, the spark plugs and contact plugs are shown in Fig. 1 as located on the center line of the rotor housing. In such case it would of course be necessary to design a timer that would permit ignition only when the spark plugs are opposite their respective contact plugs. A better arrangement than either of those referred to above is indicated in Fig. 4, which shows one of four combustion chambers Z—1 which, with their spark plugs 16ª in line with respective contact plugs 18ª, are located on one side of the cylinders, in the jacket 21 of the large rotor, the other four combustion chambers being similarly located on the opposite side of the cylinders. This design also permits of radial intake and exhaust, which is a matter of great importance as it eliminates all end thrust on the shafting. Nor does this arrangement of the intake and exhaust ports cause any radial loading on the shafting since ignition occurs at the same moment in two chambers diametrically opposite. Furthermore, the design shown in Fig. 4 makes it possible to materially decrease the diameter of the large rotor at the expense of a less important increase in width.

As will be understood already, the exhaust and intake piping for four of the combustion chambers is located on one side of the rotor housing and such piping for the other four combustion chambers is located on the opposite side. There are two suction and two exhaust channels to a side, or eight channels in all. Those on the driving side of the rotor housing, which serve the front ends of the cylinders are placed twenty-two and one-half degrees ahead of those on the crank side, which channels serve the rear ends of the cylinders. Each suction and exhaust channel is so placed and of such length as to communicate with the ports of the respective combustion chambers during proper intervals of each engine revolution. Having passed the suction or exhaust channels the ports are covered and compression or expansion take place.

At the position of the rotors shown in Fig. 2, ignition takes place in the two combustion chambers marked X—1 which are diametrically opposite one another and the spark plugs of which are in contact with plugs marked X. Following these igniations the large rotor advances forty-five degrees while the small rotor remains practically stationary, permitting the gases in chamber X—1 to expand, causing exhaust from chambers Y—2, suction in chambers X—2 and compression in chambers Y—1. By the end of this forty-five degree motion of the large rotor the spark plugs of chambers Y—1 will be opposite the contact plugs marked Y and ignition will take place in the two chambers Y—1 followed by another forty-five degree rotation of the large rotor. In the meantime the small rotor travels ninety degrees causing exhaust from chambers X—1, suction in Y—2, compression in X—2 and expansion in Y—1. The contact plugs marked X next cause ignition in chambers X—2 and the large rotor again advances forty-five degrees while the small rotor remains practically stationary, producing suction in X—1, compression in Y—2, expansion in X—2 and exhaust from Y—1. Ignition by contact plugs marked Y in chambers Y—2 is followed by another forty-five degree travel of the large rotor with a corresponding ninety-degree motion of the small rotor, causing compression in X—1, expansion in Y—2, exhaust from X—2 and suction in Y—1. It will be observed that the rotors have now turned one-half revolution and, in the meantime, a complete four-cycle has been developed on either side of each piston. This same process is repeated for every one hundred and eighty degree rotation. For each revolution of the engine, therefore, we complete two four-cycles at either end of each cylinder and, having four cylinders, we make a total of sixteen complete cycles per revolution.

The rotating parts of the engine rest in bearings 32, 33 and 34, which carry the weight only of the moving parts. The pressure in any of the cylinders is balanced by an equal pressure in the cylinder diametrically opposite, which circumstance eliminates radial loads on the rotor shafts and bearings. Furthermore, as the cylinders are fully contained within the large rotor the cylinder pressures can produce no end thrust on the shafts of the engine. A double thrust bearing 35 is provided to take up the unbalanced side pressures on the large rotor due to ports 31. With the design shown in Fig. 4, however, this thrust bearing can be elminated. The crank case mechanism is also protected from undue loading. At the moment of ignition the pinion cranks are always at or near dead center position, permitting the explosion pressures to be taken up by the crank pins and pinion taps. The teeth of the pinions and the internal gear, therefore, are not exposed to the load of the maximum cylinder pressure.

The large rotor, which runs at constant speed and is direct-connected to the driving shaft 37, also serves as a fly wheel. A clutch 36 is provided for starting. Pipes 27 furnish oil under pressure for lubrication of the rotors, and the entire crank case mechanism runs in oil. Common practice can be followed for packing 28, 29 and 30.

Figs. 5 to 9, inclusive, show a six cylinder double-acting four cycle rotary piston engine designed on the same general principles as the engine just described except that poppet valves have been substituted for the valveless arrangement shown in Figures 1 to 4 inclusive.

This engine has a stationary rotor housing 101 containing the rotors, a stationary crank case housing 102 containing the mechanism which controls the motion of the rotors, and shafts 103 and 104 which carry the rotating parts of the engine and connect the rotors to the mechanism of the crank case. An annular space is formed between the small rotor 105 and the two cylinder halves 106 of the large rotor 107. Six blocks 108 of the large rotor divide this space into six equal sections, termed cylinders, in which six pistons 109 of the small rotor oscillate.

The small rotor and the cross head 110 are keyed to the shaft 103. The large rotor and the bearing plate 111 are keyed to the hollow shaft 104. Another bearing plate 112, carried on a bearing in the crank case housing, is rigidly connected to the bearing plate 111 by means of stay-bolts 113 and the two bearing plates thus move as one piece with shaft 104 and the large rotor. The two shafts 103 and 104 are interconnected by wrist pins 114, connecting rods 115, crank shafts 116 and pinions 117. The pinions 117 are keyed to the crank shafts 116 and engage the teeth of stationary internal gears 118.

The gear ratio of the pinions to the internal gears is one to six, and a thirty-degree rotation of the large rotor, therefore, must cause the pinions to turn one hundred and eighty degrees around their own axes. In so doing, the pinions turn the crank shafts one-half revolution. It follows that the connecting rods make one complete stroke for every thirty-degree turn of the large rotor, or twelve strokes per revolution. Every second stroke, however, is directed opposite to the direction of engine rotation and serves to permit the small rotor to remain practically stationary while the large rotor advances thirty degrees. The balance of the strokes are made in the direction of engine rotation and permit the small rotor to advance sixty degrees and gain thirty degrees on the large rotor. In this way the pistons of the small rotor make twelve strokes and complete three four-cycles at either end of each cylinder for each engine revolution. With six cylinders, therefore, the engine will furnish thirty-six four-cycles per revolution. The actual crank, connecting rod and wrist pin motion is plotted in diagram, Fig. 10.

On either side of the cylinder halves 106 are located casings 119, for the valves and valve mechanism which form part of and move with the large rotor. Said cylinder halves and valve casings are held together by a right and left threaded ring 120. The engine has twelve valves 121 which serve both for intake and exhaust. Six of these valves are located in the valve casing on the driving side of the large rotor and serve the front ends of the cylinders ahead of the pistons, while the other six serve the back ends of the cylinders in the rear of the pistons and are located in the valve casing on the crank side of the large rotor. Passages 122 at either end of each cylinder furnish communication between the cylinders and the valve chambers 123. The valve ports 124 are located in the outside walls of the valve casings and sweep the exhaust chambers 125 and the intake chambers 126 of the rotor housing. The valves open these ports for periods corresponding to about sixty-degree rotation of the large rotor. For about thirty degrees the valve ports communicate with the exhaust chambers and permit the products of combustion to be expelled through exhaust pipes 127 and during the remaining thirty degrees the open valve ports sweep the intake chambers and permit suction through pipes 128. In passing from exhaust to suction, the valve ports are covered momentarily by ribs 129 in the rotor housing. Packing rings 130 and radial spring packings 131 are provided to prevent leakage.

The valves shown in the figures are of the rotary or oscillating type and balanced as to pressure. Their operation is controlled by stationary valve cams 132 which are secured to the rotor housing. As the large rotor revolves, the cam rollers 133 are lifted or lowered radially while the springs 134 hold them down against the cams. Said motion of the cam rollers serves to operate the valves by means of spring barrels 135, links 136 and bell cranks 137. The valve cams are designed to open and close the valve ports alternately for every sixty-degree rotation of the large rotor and each cam roller operates two adjacent valves, both on the same side of the rotor, simultaneously opening the one and closing the other valve or vice versa.

The engine has twelve spark plugs 138 which are located in the cylinder halves 106 on the centers of the passages leading from the cylinders to the valve chambers. Six of these plugs, at the front ends of the cylinders, are located toward the driving side of the engine and are in line with three of the contact plugs 139. The other six spark plugs, for the rear ends of the cylinders, are placed towards the crank side of the engine in line with another set of three contact plugs 139. Furthermore, the spark plugs for said rear and front ends are situated fifteen degrees apart, the intervening space in the large rotor being utilized for passages 122 and blocks 108. Said contact plugs are located in the rotor housing and are spaced to cause ignition at the proper moments. For every thirty-degree rotation of the large rotor, ignition takes place simultaneously in three cylinders, at points one hundred and twenty degrees apart. In this connection it should be noted that the contact arrangement shown in the figures is merely diagrammatic and that a contact ring and brushes should be used in actual practice.

A water circulating system serves to cool the engine. Water under pressure is furnished through a pipe 140 into the annular inlet chamber 141 in the rotor housing. A number of holes 142 lead from this chamber to the cooling space 143 in the large rotor. Having passed over the cylinder walls and through the blocks of the large rotor the water escapes through a number of openings 144 into the annular outlet chamber 145 and out through a pipe 146. Also, the small rotor and the pistons may readily be cooled by letting part of the water pass through holes 147 and pipe ducts 148 into the annular chamber 149 of the small rotor. From there it is led through the pistons to an annular chamber 150 and escapes through pipe ducts 151 and holes 152 into chamber 145. Packings 153 and 154 are provided to prevent water leakage. A possible way of circulating cooling water through the valves has also been shown in the figures.

Forced feed lubrication should be provided for the rotors, and two annular oil wells 155 in the rotor housing serve to distribute the oil to the valve cams, valves and all rubbing surfaces. The forced feed lubrication should also be applied to the rotor shafting and shaft bearings. The entire crank case mechanism runs in oil.

The rotor housing 101 is built up of two end casings 157, which are held in place by a circular casing 158 split horizontally along the center line of the engine. The crank case housing is of similar construction. Removable covers 159 are provided at the top of the circular rotor casing to facilitate the exchange of valves, cam rollers or other parts of the valve mechanism, and the upper half of the circular crank case housing 102 is made removable for ready inspection of the crank mechanism.

A clutch 156 for starting is shown at the crank end of the engine and the bearing plate 112 is provided with teeth to match. A sixty-degree turn of the crank will suffice to cause suction, compression and ignition in three cylinders.

At the times of explosion the crank shafts turn over their dead centers. The maximum load, therefore, due to the explosion pressures, is transmitted to the crank shaft bearings in the bearing plates 111 and 112 and does not reach the teeth of the pinions and the internal gears. The actual tooth pressure varies with the crank position and the difference between the explosion pressures on the one side of the pistons and the compression pressures on the opposite side. Assuming an explosion pressure of three hundred pounds per square inch, the pressure curves for expansion and compression will intersect at about thirty-seven and one half pounds per square inch, at which point the pressures on either side of the pistons will balance one another. At this time the tooth pressures will shift from one side of the gear teeth to the other, but as this occurs under balanced conditions the shifting will take place without any blow to the gear teeth. From the point of balanced piston pressure to the point of ignition, corresponding to about four degrees rotation of the large rotor, the inertia of the moving parts will furnish part of the energy required for the work of compression.

The engine shown in Figs. 5 to 9, inclusive, is drawn to scale and is figured for a speed of five hundred revolutions per minute. It occupies a space about thirty inches in length and twenty-seven inches in diameter. Each piston has an area of eleven and two-tenths square inches and the mean piston velocity is about two thousand feet per minute. The corresponding maximum velocity is, on account of the arrangement of the crank mechanism, considerably lower than the corresponding maximum piston velocity in the ordinary types of engines, in which the maximum velocity in most cases exceeds the mean velocity by more than fifty per cent, depending on the ratio of crank radius to length of connecting rod. Always having expansion in three cylinders, assuming an explosion pressure of three hundred pounds per square inch, corresponding to a mean effective pressure of about seventy-five pounds per square inch, and at eighty per cent mechanical efficiency, we figure the power developed at—

$$\frac{3 \times 11.2 \times 75 \times 2{,}000 \times .8}{33{,}000} = 122 \text{ brake horse power.}$$

The maximum stresses calculated for these conditions and given below do not exceed those allowed in general motor practice:— pistons, 3116 lbs. per sq. in.; small rotor shaft, 16800 lbs. per sq. in.; large rotor shaft, 20000 lbs. per sq. in.; wrist pins, 12300 lbs. per sq. in.; crank shafts, 13800 lbs. per sq. in.; gear teeth, 9000 lbs. per sq. in.; if based on indicated horse power, and 7200 lbs. per sq. in. if based on brake horse power.

The main bearings of the engine carry the weight only of the moving parts. Accepted automobile and motor boat practice has been followed in the design of wrist pin and crank shaft bearings. Such practice has also been followed in dimensioning the valves, the valve ports and the suction and exhaust piping. The valve port area has been taken at twenty-one per cent of the piston area.

Figs. 11 to 15, inclusive, show a six cylinder double acting four cycle rotary piston engine designed on the sleeve valve principle. Two valve discs serve the same purpose as the valve sleeves do in an ordinary engine. Crank mechanism and shafting not shown in Figs. 11 to 15, inclusive, are same as those of the poppet valve engine just described.

The combustion chambers 57 are placed in casings 58 which are located on either side and form part of the large rotor. The valve mechanism is also contained within these casings. The combustion chambers for the front ends of the cylinders are placed in said casing to one side of the rotor and those for the rear ends of the cylinders in said casing to the other side. Passages 59 furnish direct communication between the combustion chambers and respective cylinders, and valve ports 60 are located in the outside walls of casings 58. The valve ports are opened and closed by means of disc valves 61 which are confined between said casings and the retaining plates 62. These plates have openings 63 corresponding to the valve ports in the casings 58. Only a slight turn of the disc valves suffices to open or close the ports and this motion is controlled by the stationary valve cams 64, which operate the disc valves by means of cam rollers 65, levers 66 and adjustable links 67. It should be noted that the disc valves are cut away between the valve ports to prevent gases from being entrapped between the casings and the retaining plates and also to permit the proper securing of said retaining plates to the casings at the valve ports.

The cylinder blocks and pistons have been made somewhat thicker than in the poppet valve engine so as to make up for the space added at the ends of each cylinder in the form of separate combustion chambers. Another alteration is the use of a commutator 68 for the ignition system. This commutator has twelve insulated contacts 69, six of which are connected to the spark plugs of the combustion chambers to one side of the rotor and the other six to the spark plugs on the other side. The contacts for each side are divided into two groups and each group has three contacts, one hundred and twenty degrees apart, connected electrically with one another and with three spark plugs also one hundred and twenty degrees apart, to cause three ignitions simultaneously for each contact. With such a commutator a single brush 70, connected to battery or magneto, will suffice to cause the thirty-six ignitions required per engine revolution. The brush holder should be mounted preferably on top of the rotor housing and should be adjustable, either forward or backward. The ignition can thus be advanced or retarded at will, and no timer will be needed for the engine.

The efficiency of the engine will largely depend upon to what extent leakage can be prevented between the rotors and at the valves, and the packings employed must give the necessary tightness without undue friction. If the two rotors are made of the same kind of material and both are water cooled in the same manner, the expansion will be as nearly equal as possible. Furthermore, the rotors being perfectly balanced as to pressure, there should be no appreciable wear on the large bearing surfaces of the small rotor shaft. Under such circumstances the clearances in these bearings can be made about two thousandths of an inch, which will permit practically a ground fit between the two rotors. As a matter of fact, the small rotor should be ground into the large rotor, removing the cylinder blocks for the purpose. For further tightening between the pistons and the cylinder wall, three U-shaped springs 71 are provided to each piston. Due to spring tension the shanks of the U-springs will press against the sides of the cylinders while the centrifugal force will tend to make an all-around fit between these springs and the cylinder wall. The cylinder blocks which are secured to the large rotor require packing only on one side where they bear against the small rotor. Three straight bars with beveled sides and a flat spring bearing on the middle bar should furnish necessary tightness.

On either side of the small rotor and close to its outer edge are three beveled snap rings 72 to prevent leakage along the sides of the small rotor. Said snap rings have a tendency to increase their diameters and will wedge against the large rotor due to their beveled contact surfaces; the pressure depending on the spring tension of the snap rings and the degree of bevel. Labyrinth packings 73 are also provided between the two rotors.

A properly designed system of lubrication will assist materially to prevent leakage. A central oil hole 74 in the shaft of the small rotor is connected to the oil pump and oil is forced through passages 75 and 76 into the oil wells 77 of the small rotor. From there the oil enters the clearances between the rotors through holes 78 and reaches the labyrinth packings 73 and the snap rings 72. A pressure equilibrium will be established between the oil trying to enter the cylinders and the gases trying to escape, and oil under suitable pressure will thus maintain proper lubrication and at the same time will eliminate leakage. The suction strokes of the pistons will not upset this equilibrium because the oil is furnished by the pump at a fixed rate only. The oil is also sluggish and has to pass a number of bends in the labyrinth and the pressure changes in the cylinders are too rapid to affect the flow of the lubricant.

Packing rings 79 are provided to prevent leakage of cooling water. These packings are beveled where they bear against the large rotor to utilize the water pressure inside the packing rings and the oil pressure outside the packing rings to assist the flexible packing rings 80 to press the rings 79 against their rubbing surfaces.

Snap rings 81, beveled forty-five degrees on the outer edge and placed in circular grooves in the casings 58, provide against leakage at the valve ports. These snap rings encircle the valve ports and bear against the disc valves due to spring tension which, tending to increase the diameter of the snap ring, pushes it against the disc valve due to said forty-five degrees bevel. Any superimposed pressure on the snap rings, due to pressures in the combustion chambers, will also tend to increase the diameter of the snap rings but causes no friction as no pressures exist in the combustion chambers at the time the disc valves are operated.

The exhaust and suction chambers in the rotor housing are separated by radial packing bars 82 bearing on the retaining plates 62 of the large rotor. Only slight pressure is required for tightness at these points and may be furnished by flat springs 83 back of the packing bars.

With the great number of impulses obtained per revolution it is evident that my rotary piston engine is very powerful in proportion to its size and weight. With six, eight or ten cylinders the number of cycles would be thirty-six, sixty-four and one hundred per engine revolution. If designed for two-cycle operation or for steam the number of impulses would of course be doubled. As a matter of fact the size and the weight of a rotary piston engine will be considerably less than half of those of an ordinary engine of the same horse power and, by using first class material, and aluminum wherever permissible, the weight can be brought down to favorably compare with the lightest type of four-cycle engines made.

My rotary piston engine has very many less parts and can be manufactured very much cheaper than an ordinary engine. The reduced number of moving parts will cause less trouble, adjustments, renewals and repairs. The cost of manufacturing six tiny crank shafts is considerably less than making a six or twelve throw single crank shaft of far greater dimensions and with large journals. Two stationary valve cams in the rotary piston engine will also require considerably less work than a counter shaft with twelve or twenty-four solid cams. The large rotor consists only of four main parts of which two and two are alike and the machining of which cannot be compared to the machining of the six or twelve cylinders of the ordinary engine.

Another deciding advantage of my rotary piston engine is the low number of revolutions at maximum piston speed. The crank case mechanism is in itself a reduction gear which makes it possible to connect the driving shaft of the engine directly to the rear axle of a motor car or to the propeller of a motor boat. Where high rotative speeds are desired as in the case of air propellers, this feature may readily be attained by the use of a separate driving shaft connected to a central gear as shown in Fig. 16. As shown in this figure the driving shaft 90 carries a central gear 91 and the pinions of the crank mechanism which run in mesh with the stationary internal gear also engage this central gear which is keyed to said driving shaft. If applied to the engine shown in Figs. 5 to 9, inclusive, which is calculated for a speed of five hundred revolutions per minute, the central gear would give a corresponding driving shaft speed of twelve hundred and fifty revolutions per minute.

While the pistons of the ordinary reciprocating engine are subject to side thrust due to the angularity of the connecting rod, the rotors of my rotary piston engine run without any pressure thrust whatsoever, and the comparatively small variation in piston speed means a more constant flow of gases through the valve ports, less friction, and better efficiency. It will also be noted from the above that my rotary piston engine is easily adapted to a valveless construction which makes for an engine of extreme simplicity.

While the internal combustion engine has been used as an example for the application of my rotary piston engine principle, and different valve arrangements have been discussed to indicate the extraordinary advantages obtained with this principle, it is evident that any pressure fluid may be used in my rotary piston engine. With proper modifications of design, it may serve as a steam, oil or gas engine. It also goes without saying that my rotary piston engine may be rotated by external power and the apparatus used as a fan, blower or pump. In the subjoined claims, the term "engine" is to be understood as including all applications of the apparatus therein claimed, whether such apparatus is employed as a source of power, as in an internal combustion engine, or as a power-driven element, as in a pump. Two or more sets of rotors can, of course, be coupled together to furnish multiple stages for expansion or compression, or two or more sets of rotors may be coupled together and so arranged that the combined unit will have no dead-center position.

Another modification of my rotary piston engine principle consists in making the cylinder blocks stationary and permitting oscillations only of the small rotor and the pistons. This motion would rotate the pinions of the crank mechanism and drive the internal gear, which in this case would be keyed to a driving shaft.

It will be observed that the several parts of my rotary engine are perfectly balanced, that is to say, the loads on the engine bearings remain the same whether the engine is running or idle, since all of the working forces acting on and transmitted to and by the shafts are in theoretically perfect balance without causing any reaction on the bearings.

While I have herein described and shown in considerable detail certain effective forms in which my invention may be embodied in actual practice, it is to be understood that my invention is not restricted to the precise arrangement of parts herein shown, but that numerous changes and adaptations may be made without departing from my invention. I therefore desire that no limitations be imposed by my invention except such as are indicated in the appended claims.

What I claim is:

1. In an engine, the combination of a rotor having blocks which sweep an annular space and which blocks divide said space into a plurality of working chambers, another rotor having pistons projecting into said working chambers between said blocks, said rotors being adapted to revolve around a common axis, means for interconnecting the said rotors and for causing a reciprocating motion between said blocks and said pistons when the engine is running, and disc valves forming part of one of the rotors which disc valves are common to and open and close a plurality of valve ports.

2. In an engine, the combination of two rotors having an annular space between them, blocks in one of said rotors which blocks divide said space into a plurality of working chambers, pistons forming part of the other of said rotors projecting into said working chambers between said blocks, said rotors being adapted to revolve around a common axis, means for interconnecting the said rotors and for causing a reciprocating motion between said blocks and said pistons when the engine is running, and disc valves on either side of said working chambers, forming part of one of the rotors and which disc valves are common to and open and close all the valve ports on either side of said working chambers.

3. In an engine, the combination of two rotors having an annular space between them, at least four blocks in one of said rotors which blocks divide said space into a like number working chambers of equal size, at least four pistons forming part of the other of said rotors and projecting into said working chambers between said blocks, said rotors being adapted to revolve around a common axis, shafts carrying the said rotors, mechanism of connecting rods, cranks and pinions interconnecting said shafts, a stationary gear engaging said pinions, the gear ratio of said gear to said pinions being equal to the number of said working chambers and also to the number of said pistons, said mechanism and gear causing said pistons of the one rotor to oscillate within said chambers and between said blocks of the other rotor when the engine is running, valves and valve mechanism for inlet and discharge located outside said annular space, and disc valves on either side of said working chambers, forming part of one of the rotors and which disc valves are common to and open and close all the valve ports on either side of said working chambers.

4. In an engine, the combination of a rotor having blocks which sweep an annular space and which blocks divide said space into a plurality of working chambers, another rotor having pistons projecting into said working chambers between said blocks, said rotors being adapted to revolve around a common axis, means for interconnecting the said rotors and for causing a reciprocating motion between said blocks and said pistons when the engine is in operation, the cross section of said annular space having a curved surface, and U-shaped springs to provide for tightness between the rubbing surfaces of said working chambers and said pistons due to tension of said springs and due to centrifugal forces acting on said springs when the engine is in operation.

5. In an engine, the combination of a rotor having an even number of not less than four equidistant blocks which sweep an annular space and which blocks divide said space into working chambers, another rotor having pistons projecting into said working chambers, one piston between each two successive blocks, said rotors being adapted to revolve around a common axis, shafts rigidly secured to said rotors, not less than two sets of mechanisms, each set consisting of connecting rod, crank and pinion, which sets of mechanisms interconnect said shafts, a stationary gear engaging said pinions, said mechanisms and gear causing said pistons of the one rotor to oscillate between said blocks of the other rotor when the engine is in operation, the cross section of said annular space having a curved surface, and U-shaped springs to provide for tightness between the rubbing surfaces of said working chambers and said pistons due to tension of said springs and due to centrifugal forces acting on said springs when the engine is in operation.

6. In an engine, the combination of a rotor having blocks which sweep an annular space and which blocks divide said space into a plurality of working chambers, another rotor having pistons projecting into said working chambers between said blocks, said rotors being adapted to revolve around a common axis, means for interconnecting the said rotors and for causing a reciprocating motion between said blocks and said pistons when the engine is in operation, and means whereby the lubricant needed for said blocks and pistons is supplied under pressure and forced to pass through a labyrinth packing formed between said rotors before it reaches said blocks and pistons, for the purpose of utilizing said lubricant to prevent leakage from said working chambers.

7. In an engine, the combination of a rotor having an even number of not less than four equidistant blocks which sweep an annular space and which blocks divide said space into working chambers, another rotor having pistons projecting into said working chambers, one piston between each two successive blocks, said rotors adapted to revolve around a common axis, shafts rigidly secured to said rotors, not less than two sets of mechanisms, each set consisting of connecting rod, crank and pinion, which sets of mechanisms interconnect said shafts, a stationary gear engaging said pinions, said mechanisms and gear causing said pistons of the one rotor to oscillate within said blocks of the other rotor when the engine is in operation, and means whereby the lubricant needed for said blocks and pistons is supplied under pressure and forced to pass through a labyrinth packing formed between said rotors before it reaches said blocks and pistons, for the purpose of utilizing said lubricant to prevent leakage from said working chambers.

8. In an engine, the combination of a rotor having blocks which sweep an annular space and which blocks divide said space into a plurality of working chambers, another rotor having pistons projecting into said working chambers between said blocks, said rotors being adapted to revolve around a common axis, means for interconnecting the said rotors and for causing a reciprocating motion between said blocks and said pistons when the engine is in operation, the cross section of said annular space having a curved surface, and U-shaped springs to provide for tightness between the rubbing surfaces of said working chambers and said pistons.

9. In an engine, the combination of a rotor having an even number of not less than four equidistant blocks which sweep an annular space and which blocks divide said space into working chambers, another rotor having pistons projecting into said working chambers, one piston between each two successive blocks, said rotors adapted to revolve around a common axis, shafts rigidly secured to said rotors, not less than two sets of mechanisms, each set consisting of connecting rod, crank and pinion, which sets of mechanisms interconnect said shafts, a stationary gear engaging said pinions, said mechanisms and gear causing said pistons of the one rotor to oscillate between said blocks of the other rotor when the engine is in operation, ports for intake and exhaust located on either side of said working chambers, and a valve common to and serving all of said ports on either side of said working chambers.

10. In an engine, the combination of a rotor having an even number of not less than four equidistant blocks which sweep an annular space and which blocks divide said space into working chambers, another rotor having pistons projecting into said working chambers, one piston between each two successive blocks, said rotors adapted to revolve around a common axis, shafts rigidly secured to said rotors, not less than two sets of mechanisms, each set consisting of connecting rod, crank and pinion, which sets of mechanisms interconnect said shafts, a stationary gear engaging said pinions, said mechanisms and gear causing said pistons of the one rotor to oscillate between said blocks of the other rotor when the engine is in operation, in which engine the port and valve for intake and exhaust for one end of each working chamber is located to one side of said working chambers and the port and valve for the other end is located to the opposite side of said working chambers.

11. In a double-acting rotary engine, the combination of a rotor having an even number of equidistant blocks which sweep an annular space and which blocks divide said space into working chambers, another rotor having pistons projecting into said working chambers, one piston between each two successive blocks, valves and valve mechanism for inlet and discharge located outside said annular space, said rotors being adapted to revolve around a common axis, shafts rigidly secured to said rotors, a crosshead rigidly mounted on one of said shafts, a bearing plate rigidly mounted on the other of said shafts, not less than two equidistant sets of mechanism, each set consisting of connecting rod, crank and pinion, which sets of mechanism interconnect said shafts by means of said crosshead and said bearing plate, a stationary gear engaging said pinions, said mechanisms and gear causing said pistons of the one rotor to oscillate within said blocks of the other rotor when the engine is in operation, in which engine the working pressures in said working chambers are exerted simultaneously at points which divide said annular space into equal parts and in which engine said connecting rods actuate said crosshead at equidistant points, so as to cause all working loads on said shafts to balance.

In testimony whereof, I, the said OSCAR A. THELIN, have hereunto set my hand.

OSCAR A. THELIN.

Witnesses:
 EDWARD JOHNSON,
 A. B. COOK.